(12) United States Patent
Whitfeld (10) Patent No.: US 11,378,358 B2
(45) Date of Patent: Jul. 5, 2022

(54) TARGET DISPLAY DEVICE

(71) Applicant: Towarra Holdings Pty. Ltd., New South Wales (AU)

(72) Inventor: Samuel Whitfeld, New South Wales (AU)

(73) Assignee: Towarra Holdings Pty. Ltd., New South Wales (AU)

( * ) Notice: Subject to any disclaimer, the term of this patent is extended or adjusted under 35 U.S.C. 154(b) by 0 days.

(21) Appl. No.: 17/275,826

(22) PCT Filed: May 21, 2019

(86) PCT No.: PCT/AU2019/050490
§ 371 (c)(1),
(2) Date: Mar. 12, 2021

(87) PCT Pub. No.: WO2020/077387
PCT Pub. Date: Apr. 23, 2020

(65) Prior Publication Data
US 2022/0042770 A1      Feb. 10, 2022

(30) Foreign Application Priority Data
Oct. 15, 2018 (AU) ................ 2018903895

(51) Int. Cl.
*F41G 3/16*     (2006.01)
*F41G 3/00*     (2006.01)
(Continued)

(52) U.S. Cl.
CPC ........... *F41G 3/16* (2013.01); *F41G 3/005* (2013.01); *F41G 3/02* (2013.01); *F41G 3/18* (2013.01)

(58) Field of Classification Search
CPC ... F41G 3/18; F41G 3/02; F41G 3/005; F41G 3/16
(Continued)

(56) References Cited

U.S. PATENT DOCUMENTS 9,151,572 B1 *  10/2015  Sieracki .................... F41G 3/16
9,829,279 B1 *  11/2017  Sieracki .................. G01S 19/13
(Continued)

FOREIGN PATENT DOCUMENTS

EP       3376152 A1 *  9/2018
WO   WO-2020167530 A1 *  8/2020  ............... F41G 1/38

OTHER PUBLICATIONS

International Search Report & Written Opinion for PCT/AU2019/050490 dated Jul. 30, 2019, 7 pgs.

*Primary Examiner* — John Cooper
(74) *Attorney, Agent, or Firm* — Blank Rome LLP (57) ABSTRACT

Disclosed herein is a target display device for assisting to aim at a target beyond a vision obstructing object, the device comprising: a forward-facing camera; a target marker projector; and an orientation marker projector, wherein: the forward-facing camera is adapted to capture an image beyond the vision obstructing object; the target marker projector is adapted to project a target marker; the orientation marker projector is adapted to project an orientation marker; and the forward-facing camera is adapted to capture an image in alignment with the target marker and the orientation marker along a longitudinal axial plane through the target display device.

13 Claims, 8 Drawing Sheets

(51) Int. Cl.
   *F41G 3/02*   (2006.01)
   *F41G 3/18*   (2006.01)
(58) Field of Classification Search
   USPC .............................................. 89/41.05; 42/9
   See application file for complete search history.

(56) References Cited

U.S. PATENT DOCUMENTS

2009/0320348 A1   12/2009   Kelly
2011/0173869 A1    7/2011   Uhm
2016/0216072 A1*   7/2016   McNeil ................... F41G 3/142

\* cited by examiner

TARGET DISPLAY DEVICE

RELATED APPLICATIONS

This application is a national phase of PCT/AU2019/050490, filed on May 21, 2019, which claims priority to Australian Provisional Patent Application No. 2018903895 entitled "Target display device" and filed on 15 Oct. 2018 in the name of Towarra Holdings Pty. Ltd. The entire contents of these applications are hereby incorporated at by reference.

TECHNICAL FIELD

The present disclosure relates to a firearm aim assisting device. In particular, the present disclosure relates to a device for assisting with aiming at a target that is visually obscured by an opaque medium, such as a door, located between a shooter with the firearm and the target.

BACKGROUND OF THE INVENTION

In a shooting operation, a shooter ideally has an effective, direct visual contact with the target. However, situations arise in which the shooter does not have a visual of the target because of an obstructing object, such as when the target is inside a room or a building that the shooter cannot enter or cannot enter safely.

Thus, a need exists to provide a means to assist firearm aim in a scenario where the shooter's line of vision to the target is blocked by an intervening object.

SUMMARY OF THE INVENTION

The present disclosure relates to a target display device for assisting aim of a firearm at a target that is located beyond a vision obstructing object.

An aspect of the present disclosure provides a target display device for assisting to aim at a target beyond a vision obstructing object, the device comprising: a forward-facing camera; a target marker projector; and an orientation marker projector, wherein: the forward-facing camera is adapted to capture an image beyond the vision obstructing object; the target marker projector is adapted to project a target marker; the orientation marker projector is adapted to project an orientation marker; and the forward-facing camera is adapted to capture an image in alignment with the target marker and the orientation marker along a longitudinal axial plane through the target display device.

Preferably, when in use, the forward-facing camera is adapted to be placed to have the target in line of sight; the target marker projector is adapted to project the target marker on the vision obstructing object, the target marker location being indicative of a location of the target; and the orientation marker projector is adapted to project the orientation marker in alignment with the forward-facing camera and the target marker.

Preferably, the target marker indicates one or both of: a height for aiming at and a height range for aiming at.

Preferably, wherein the target marker is a reticle pattern.

Preferably, wherein the reticle pattern comprises one or more of: a line, a dot, a circle, intersecting lines and a rectangle.

Preferably, the target marker projector and/or the orientation marker projector projects the target marker and/or the orientation marker in laser in a visible spectrum or an infrared laser.

Preferably, the target display device has a longitudinal axial plane extending in a forward-rearward direction of the target display device, the forward-facing camera, the target marker projector and the orientation marker projector are substantially aligned along the longitudinal axial plane, the target marker projector is adapted to project the target marker upward and forward onto the object where the longitudinal axial plane intersects the object, and the orientation marker projector is adapted to project the orientation marker rearward and downward onto a surface on which the display device is placed where the longitudinal axial plane intersects the surface.

Preferably, the target display device further comprises a communication unit adapted to transmit the image captured by the camera.

Another aspect of the present disclosure provides a target display system comprising the target display device described above and a display device communicably coupled to the communication unit of the target display device, the display device adapted to display the image captured by the camera together with a reference marker indicating a centre of the image.

Preferably, the display device is a wearable device adapted to be worn on a body of a system operator positioning the target display device.

Preferably, the display device is a wearable device adapted to be worn on the arm of the system operator.

Preferably, the display device is a head-mounted device.

Another aspect of the present disclosure provides a target display module to be fitted onto a camera module having a forward-facing camera adapted to capture an image beyond a vision obstructing object, the module comprising: a target marker projector; and an orientation marker projector, wherein: the target marker projector is adapted to project a target marker and the orientation marker projector is adapted to project an orientation marker such that, when the target displaying module is fitted onto a camera module, the target marker and the orientation marker are projected in alignment with the field of the forward-facing camera.

Other aspects of the present disclosure are also provided.

BRIEF DESCRIPTION OF THE DRAWINGS

One or more embodiments of the present disclosure will now be described by way of specific example(s) with reference to the accompanying drawings, in which.

DETAILED DESCRIPTION OF THE PREFERRED EMBODIMENTS

A target display device of the present disclosure can be used as a part of an opaque medium shooting system which involves assisting a shooting operation in which a target is sheltered from the shooter behind an opaque medium. In an operation, a target display device can be used to assist a shooter to aim at a target that is obscured by an object, such as an opaque, semi-opaque, or translucent medium, where the shooter cannot see the target, but the shooter's firearm is sufficiently powerful to shoot the target through the obscuring object. The opaque, semi-opaque, or translucent medium may be, for example, but is not limited to, a door, a thin wall, or a window.

Figure 1:
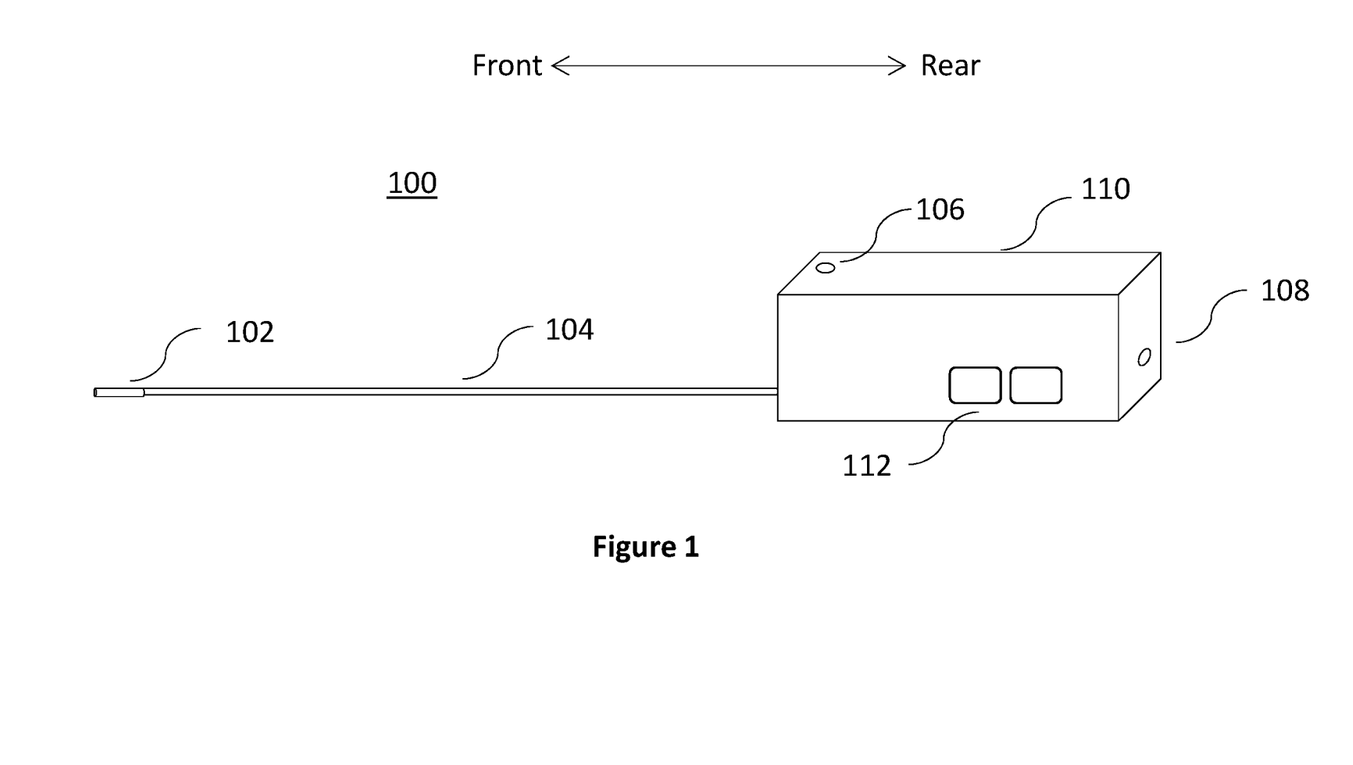
FIG. 1 is a schematic diagram of a target display device in an embodiment of the invention.
Figure 2:
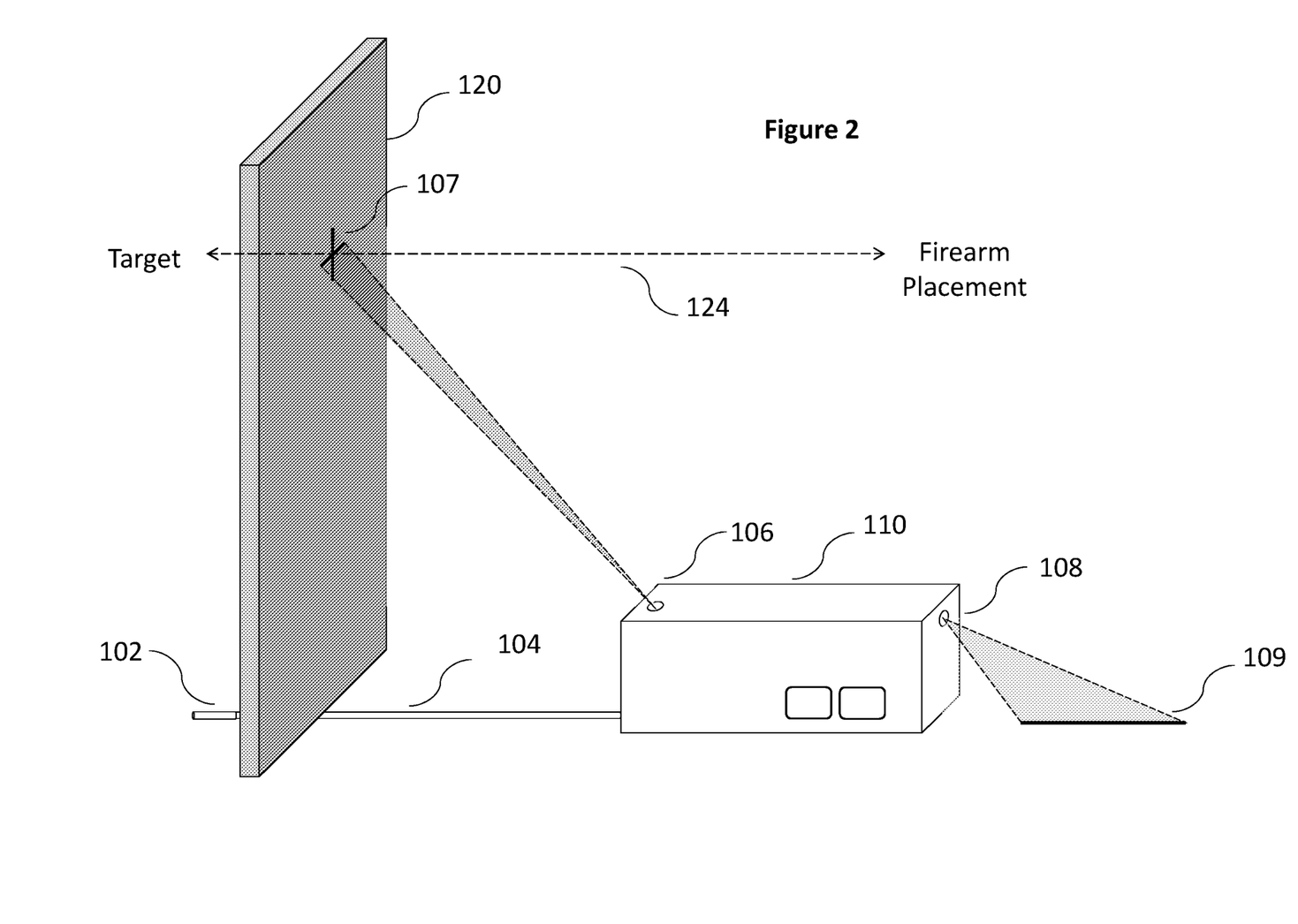
FIG. 2 is a schematic diagram of the target display device activated in use.

Referring to FIGS. 1 and 2, a target display device 100 has a main body 110 that includes a target marker projector unit 106 and an orientation marker projector unit 108. The target display device further has a forward-facing camera 102 mounted on a distal end of a support member 104 extending to the front of the target display device 100 and away from the main body 110. In use, the main body 110 remains on the same side of a vision-obstructing object 120 as an operation team including the shooter, while the camera 102 is used to capture images of the other side of the object 120 where the target is located.

The support member 104 is a thin structure, such as a slim shaft or a board having a distal end that can be inserted through a narrow space past the vision-obstructing object 120, for example by sliding under a door. This allows the camera 102 to capture an image of the space beyond the object 120 and enables the operation team to see an image of a target which is otherwise not visible to the shooter on the other side of the object 120. The camera 102 is front-facing and may be angled up to capture an image in front of the main body 110. The camera 102 may have further functionalities to improve operation, such as thermal imaging, infrared illuminator and a wide-angle lens, such as a fisheye lens. The camera 102 may also be implemented as a camera module having multiple lenses and/or image sensors with an image processor capable of selectively outputting or synthesizing, from images captured via the multiple lenses and/or image sensors, an image of the zone that is in front of the target display device 100 and is in alignment with the longitudinal axis of the target display device 100. The support member 104 may have a telescopic structure and/or be retractable into the main body 110 to allow adjustment of the position of the camera 102 relative to the main body 110 and to extend into the space beyond the object 120.

Figure 3A:
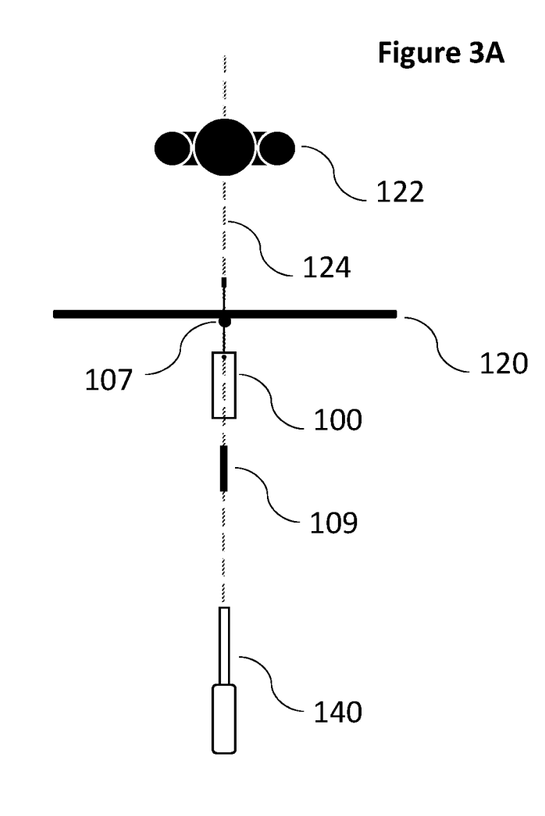
FIG. 3A is a schematic diagram showing the target display device in use in alignment with the target across an obstructing object and placement of a firearm guided by the target display device.

The target marker projector unit 106 and the orientation marker projector unit 108 are mounted on or in the main body 110 of the target display device 100. The target marker projector 106 is a light source for projecting a target marker 107 on the vision-obstructing object 120 to indicate a location for the shooter to aim the firearm at. FIG. 2 and FIG. 3A show a scenario where the target display device 100 is in place, that is, placed in front of the object 120 with the camera 102 slid under the object 120 and capturing an image of the target 122 located on the other side of the object 120. In this position, the target marker projector 106 projects the target marker 107 onto the object 120. The orientation marker projector 108 is a light source for projecting an orientation marker 109 so that when the firearm 140 is aligned with the target marker 107 and the orientation marker 109, the shooter can shoot at the target 122 by using the target marker 107 to assist with the aim, for example by aiming at the target marker 107.

The target marker projector 106 and the orientation marker projector 108 project markers 107, 109 so that when the target display device 100 is in place as shown in FIGS. 2 and 3A, the target marker 107 on the object 120 and the orientation marker 109 on the floor are substantially on the same vertical plane as the camera 102 pointed at the target 122. The shooter can take aim at the target 122 by lining up the firearm 140 with the target marker 107 projected on the object 120 and the orientation marker 109 projected on the floor.

Further, preferably, the target marker projector 106 projects the target marker 107 on the object 120 at a height that would optimise the hit probability onto the target 122. In the case where the target 122 is an adult human in an upright position, this may be between the height of 1 m to 1.5 m, and more specifically, at or about 1.25 m. It will be appreciated that different height ranges may be used, depending on the particular target and application.

When the target marker 107 is displayed on the object 120 at the height at which to aim on the target 122, the firearm 140 can be positioned at the same height as the target marker 107 and pointing at the marker 107 along the virtual line 124 so that when the shooter fires at the target marker 107, a bullet fired from the firearm 140 will penetrate the object 120 and engage the target 122 beyond the object 120 along the line 124.

Figure 5:
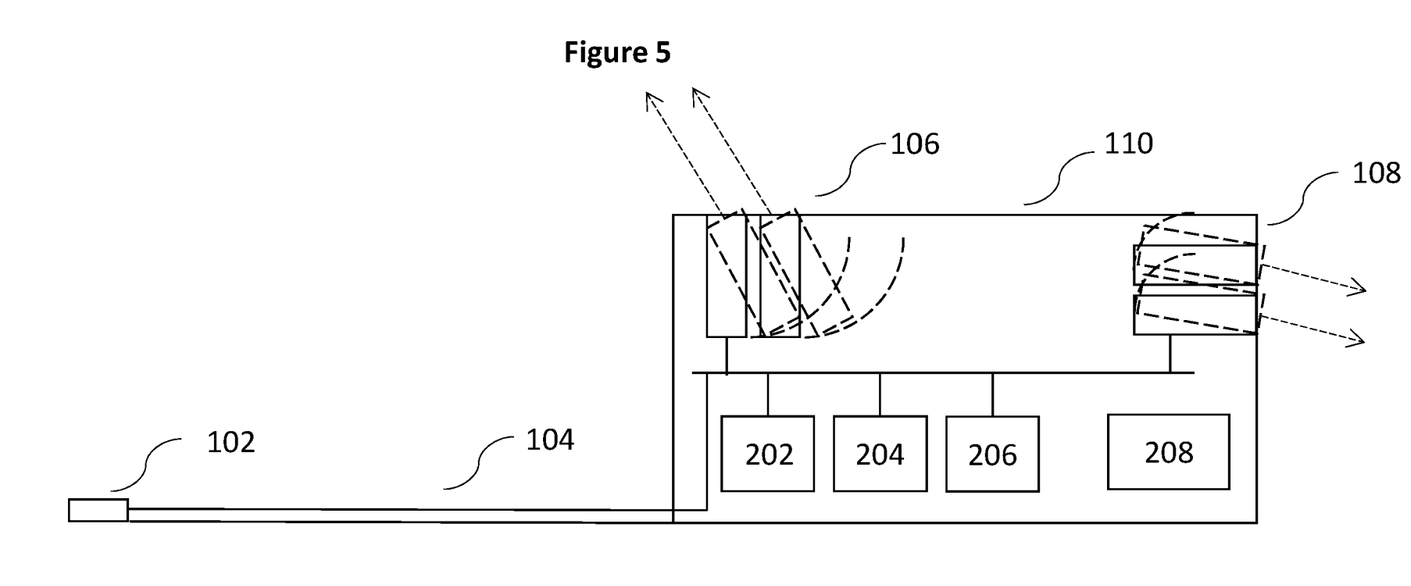
FIG. 5 is a schematic diagram showing the configuration of target marker projector(s) and orientation marker projector(s) of the target display device.

FIG. 5 shows an example arrangement of the target marker projector unit 106 and the orientation marker projector unit 108 in the target display device 100. The target marker projector 106 projects the target marker 107 upwards and towards the front of the main body 110. The orientation marker projector 108 projects the orientation marker 109, for example onto the floor, downward and rearward of the main body 110. The projectors 106 and 108 can be emitters of laser in the visible spectrum so that the shooter can see the markers 107, 109 without a special device, and/or outside the visible spectrum, such as infrared which would be advantageous for more covert operations in which situations the shooter may wear infrared goggles and thus be able to view infrared markers 107, 109.

Alternatively, the orientation marker projector 108 may emit a directional light that appears to increase in intensity when the shooter is in alignment with the longitudinal axial plane of the target display device 100 through the camera 102 and the orientation marker projector 108. Alternatively or additionally, the tilting of the projection of the markers 107, 109 may be implemented by other mechanical or optical means.

The target marker projector unit 106 can include one or more projector devices and may be mounted in the main body 110 of the target display device 100 at a fixed or adjustable angle, as shown in dotted lines, so as to project the marker(s) 107 forward at an upward angle. Multiple projectors can be employed in the target marker projector unit 106, such that one projector emits a visible laser and another projector emits an infrared laser or other types of laser outside the visible spectrum that can be seen through special-purpose viewers to be worn by the shooter and/or other operation team members. The projector can be switched on/off and/or the intensity/angles adjusted by the operator, for example by operating switches and/or dials of the control panel 112 on the target display device 100 or remotely by the shooter or other operation members.

Similarly, the orientation marker projector unit 108 can include one or more projector devices and may be mounted in the main body 110 at a fixed or adjustable angle, as shown in dotted lines, so as to project the marker(s) 109 rearward and downward. Multiple projectors can be employed to include one or more projectors that emit a visible laser and other projector(s) that emit infrared or other types of laser outside the visible spectrum, such that the projected orientation markers can only be seen with the aid of special-purpose viewers to be worn by the shooter and/or other operation members. The orientation marker projector unit 108 also can be operated from the control panel 112 on the target display device 100 or remotely.

The target display device 100 also includes a processor 202, a communication unit 204, and a storage medium 206. Preferably, the target display device 100 is a cordless device for convenience of operation, and also includes a battery 208 to power the various components of the device 100, including the camera, the projectors 106, 108, communication unit and processor.

The storage medium 206 may be utilised to store one or more computer programs, including an operating system, software applications to process input, for example, from the control panel 112 to control the camera 102 and/or the marker projectors 106, 108, and data such as image data captured by the camera 102.

The communication unit 204 communicates, preferably via a wireless communication protocol such as Bluetooth or Wi-Fi with security features, with a remote device, such as a display device 114 that shows the image captured by the camera 140. The communication unit can also transmit and/receive control data such as control command for adjusting various settings of the camera 102 (e.g., zoom, contrast) and the projectors 106, 108 (e.g., angle, laser type). The processor 202 communicates with the camera 102, the marker projectors 106, 108, the communication unit 204 and the storage medium 206 via a bus and executes the computer programs stored on the storage medium 206 to control the operation of the camera 102, projectors 106, 108 and the communication unit 204.

The camera 102 may include a lens system, a sensor unit, and a recording medium to temporarily store the captured image. The sensor unit may be a sensor for the visible light spectrum such as a basic black and white or full colour CCD or CMOS censor. The camera 102 can be a digital still camera and output still images periodically, or on manual command, or a digital video camera and output a live video image sequence to allow the system operator 144 to position the target display device 100 according to the image feed provided through the display device 114.

Figure 3B:
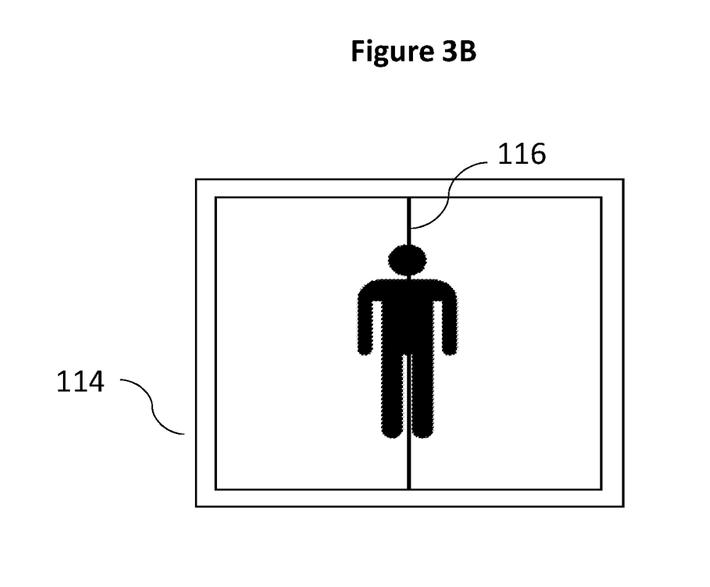
FIG. 3B is a schematic diagram of a display device when the target display device is in place in FIG. 3A.

The display device 114 includes a processor and a communication unit to communicate with the communication unit 204 of the target display device 100 and can show the image captured by the camera 102 superposed with a reference marker 116. The reference marker 116 can be permanently marked, e.g., painted, on the display device to coincide with the central axis, point or area of the image captured by the camera 102 and transmitted to and displayed on the display device 114. Alternatively, the marker can be digitally added, by the processor of the target display device 100 or the display device 114, which can be provided on the target display device 100 or the display device 114, onto the image captured by the camera 102. Whilst a permanent physical marker is simpler to implement, digitally superposing the reference marker 116 onto the camera image provides more flexibility. For example, if the display device 114 is used to display other information by switching between full-screen camera feed and another data screen, the reference marker 116 needs not be displayed in a mode displaying the data screen. Further, if the display is split into a zone showing the camera feed and a zone showing other information, by digitally superposing the reference marker 116 onto the camera image, the reference marker 116 can be shown to indicate the centreline within the image input from the camera 102.

The display device 114 can be carried by a system operator 144 who operates the target display device 100 by placing the device 100 in alignment with the target 122 and may also be provided for the shooter 142 to obtain visual information of the target and the surrounding.

Figure 7:
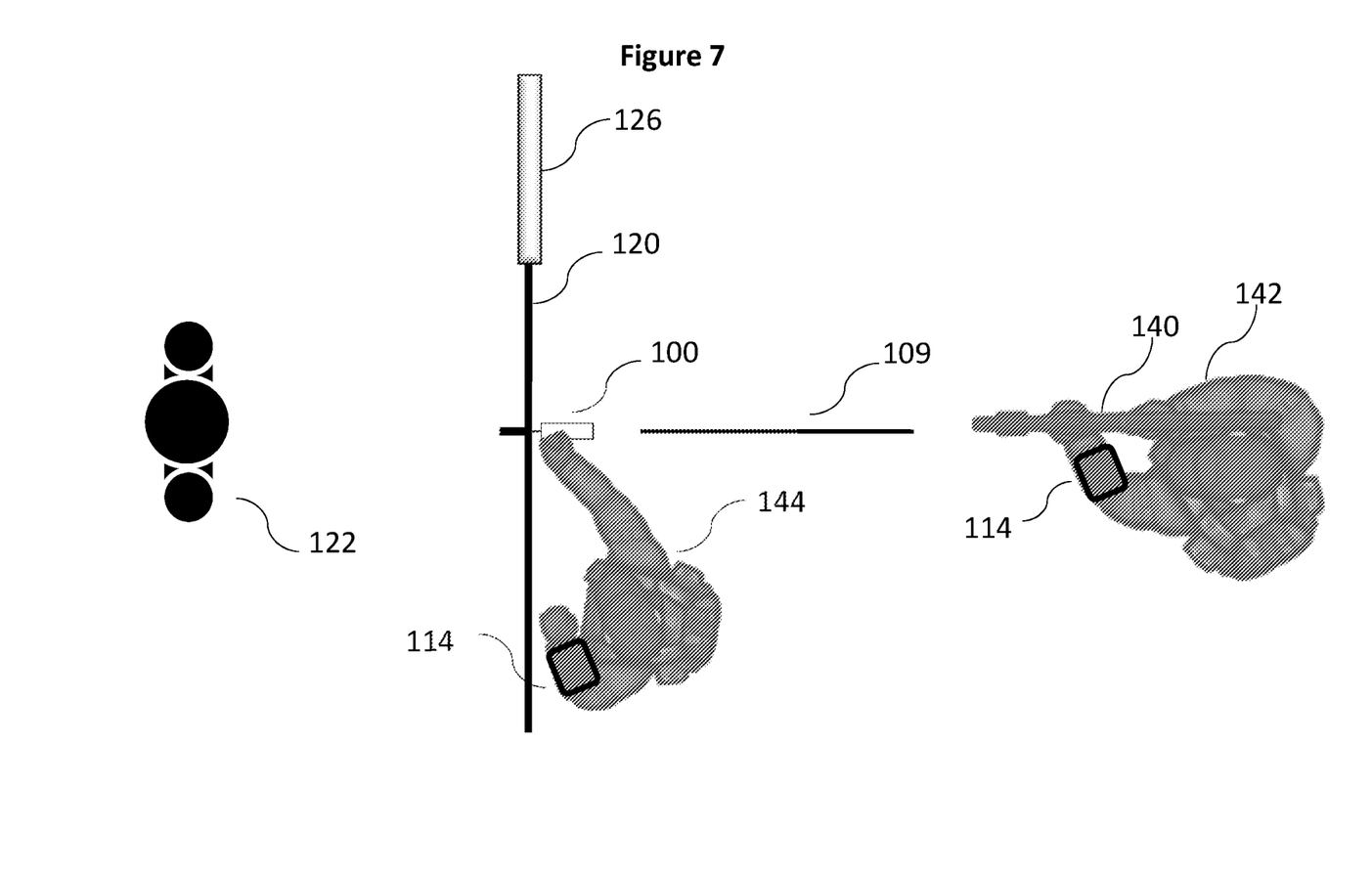
FIG. 7 is a schematic diagram showing use of the target display device in an operation.

In operation, as shown in FIG. 7, the system operator 144 may carry the display device 114 strapped on an arm. The display device 114 can also be implemented as various other types of displays, such as portable and/or wearable devices adapted to be worn on the body of the system operator 144 such as an arm-mounted device or a head-mounted device, including a heads-up display, augmented reality display device, integrated with night vision goggles and wearable lenses. The reference marker 116 is a marker to assist the system operator 144 to position the target display device 100 so that the camera 102, and the target marker 107 and the orientation marker 109 to be projected are aligned with the target 122. In types of display devices where the displayed field of vision shifts with the motion of the wearer, the target marker 107 should be displayed superposed with the incoming camera feed, and remain locked on the part of the displayed image aligned with the target display device 100. The system operator 144 positions the target display device 100 by inserting the camera 102 through a gap under/in the object 120 that is opaque and can be shot through with the firearm 142. The system operator 144 then adjusts the orientation of the target display device 100 by looking for the target in the image captured with the camera 102 and shown on the display device 114, in order to place the target display device 100 in alignment with the target 122. The system operator 144 may continue to adjust the placement of the target display device 100 as necessary, for example to track the movements of the target 122, to keep the reference marker 116 superposed with the image of the target 122 on the display device 114 until the target 122 is shot or the operation is ended.

The target marker projector 106 and the orientation marker projector 108 may be switched on while the system operator 144 is positioning the target display device 100, or can be turned on once the system operator 144 confirms that the alignment is achieved. Once the target display device 100 is in alignment and the target and orientation markers are projected onto the object 120 and the floor, respectively, the shooter 142 can move into place to aim at the target 122 by aligning the firearm 142 with the target marker 107 and the orientation marker 109.

The shooter 142 may also carry a portable/wearable display device 114. This will allow the shooter 142 to have a visual of the target 122 as it is captured with the camera 102. Having a real-time visual of the target 122, preferably with a reference marker 116 superposed with it, can give the shooter 142 information regarding the position, posture and the environment around the target 122 in addition to the target maker 107 projected onto the object 120, and can assist with a better aim.

Figure 4:
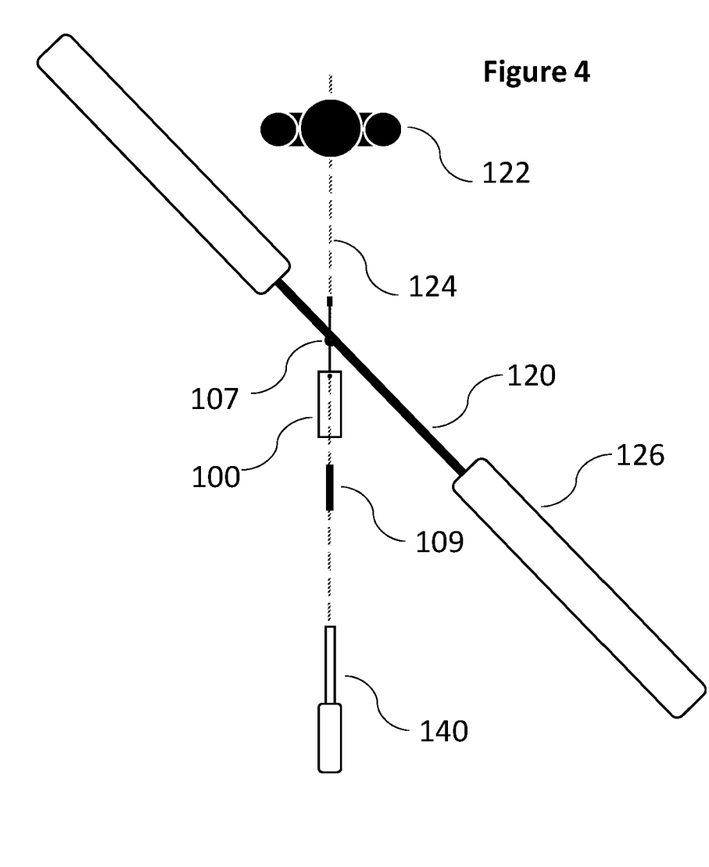
FIG. 4 is a schematic diagram of the target display device in use in an alternative configuration relative to the obstructing object.

The target display device 100 can be used in a scenario where the target 122 is directly ahead of the object 120 that can be shot through and allows the camera 102 to be placed to capture the target 122, as shown in FIGS. 3A and 7. The target display device 100 can also be used in a situation where the target 122 is partially/entirely behind a barrier 126 that cannot be shot through and/or does not allow the camera 102 to be positioned to capture the target 122, but the target display device 100 can be positioned at an angle to the object 120 to capture the target 122, as shown in FIG. 4.

In an example embodiment, the length of the target display device 100 from the camera 102 to the rear end of the main body 110 can be approximately 250 mm. The target marker projector 106 may be angled up to project the target mark 107 on the object 120 at approximately 1250 mm from the base of the object 120. The orientation marker projector 108 may project the orientation marker 109 up to approximately 450 mm from the rear end of the main body 110. The shooter 142 may position himself/herself 1-3 m from the object 120 with the firearm 140 held horizontally with the bore at about 1250 mm from the floor in order to execute a flat shot through the object 120. The firearm 140 may be equipped with a laser system to indicate the aim which allows the shooter 142 to aim by superposing the laser marker from the firearm-mounted laser system with the target marker 107. In this case, it is further preferable if the laser system of the firearm 140 is different from the laser of the target marker projector 106 such that the marker from the firearm 140 and the target marker 107 can be distinguishable, for example, by the difference in colour, shape, flashing intervals, and the like.

FIGS. 6A to 6J show various exemplary reticle patterns for the target marker 107 and orientation marker 109. The examples of FIGS. 6A to 6J are illustrative and not restrictive and other reticle patterns may be practised without departing from the spirit and scope of the present disclosure.

The target marker 107 may indicate a height range (e.g., 1-1.5 m) for aiming (FIGS. 6A, 6C, 6D, 6E, 6F and 6H) with a line/rectangle extending along the height range, horizontal lines intersecting a vertical centreline at the top and bottom of the height range and/or dots marking the top and/or bottom of the height range. The target marker 107 may indicate the height to aim at (e.g., 1.25 m), as shown in FIGS. 6B, 6D, 6E, 6F, 6I and 6J with one or more dots, horizontal line and/or a break in a vertical centreline or a horizontal line.

Figure 6A:
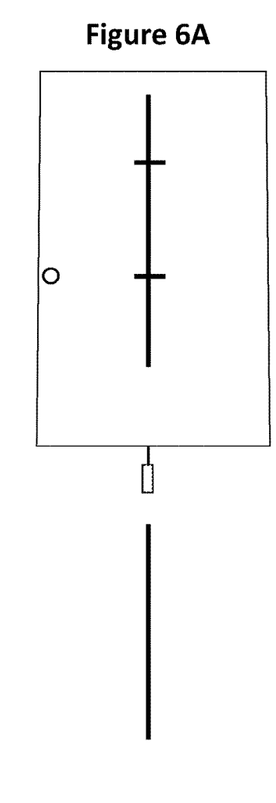
FIGS. 6A-6J shows examples of configurations of reticle patterns.
Figure 6B:
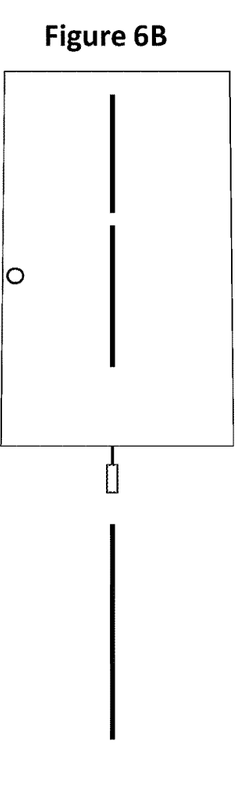
Figure 6C:
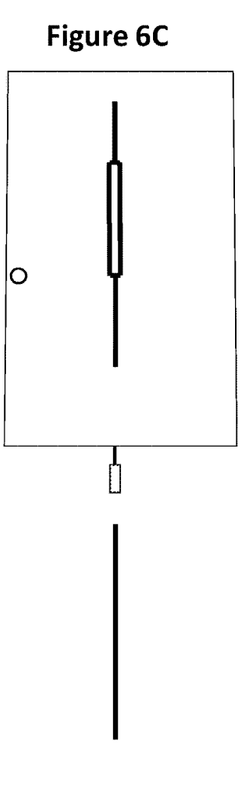
Figure 6D:
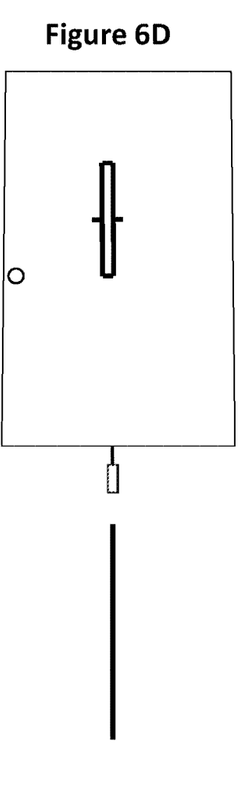
Figure 6E:
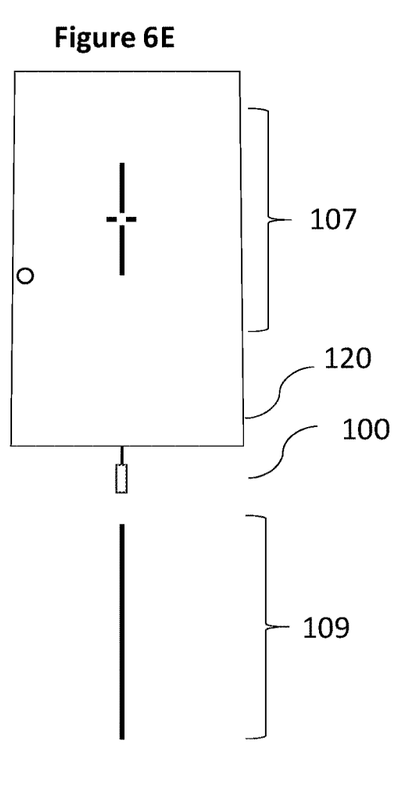
Figure 6F:
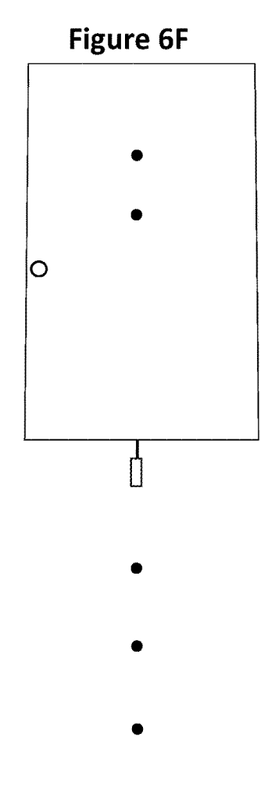
Figure 6G:
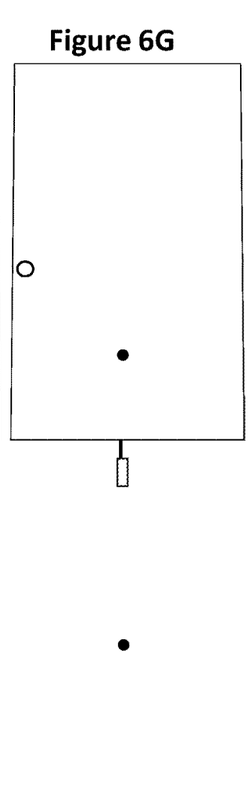
Figure 6H:
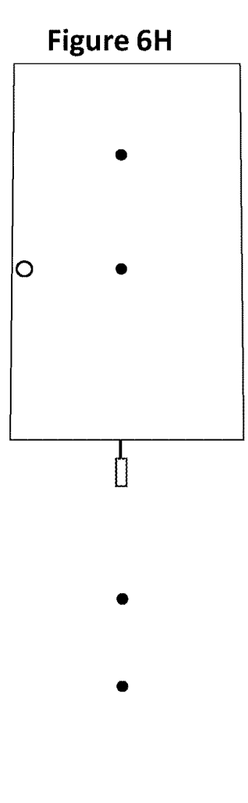
Figure 6I:
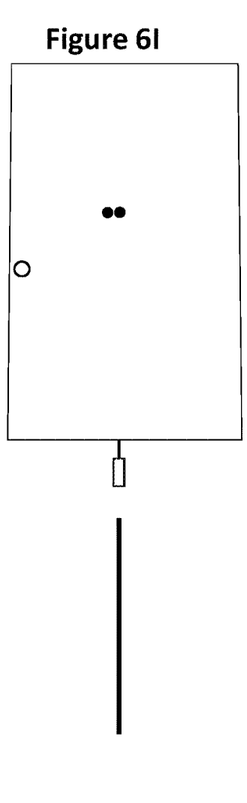
Figure 6J:
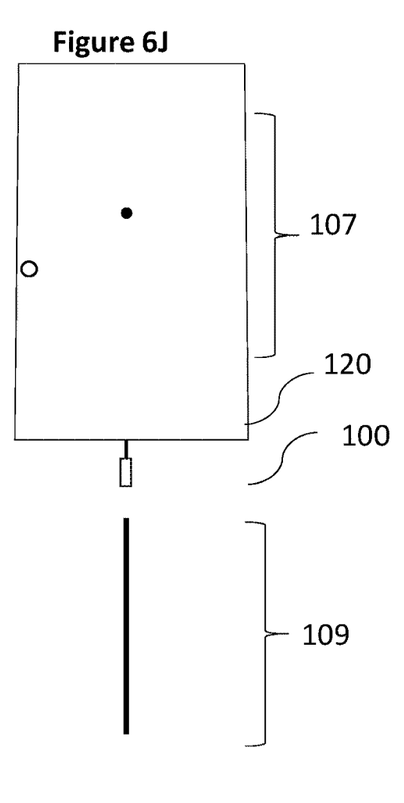

The orientation marker 109 assists the shooter 142 to determine where to position the firearm 140 to aim at the target 122, and therefore should indicate a direction from which to shoot. The orientation marker 109 may be a line, for example as shown in FIGS. 6A-6E, 6I and 6J, or a dot or dots as shown in FIGS. 6F-6H, or any combination thereof.

As a result, by lining up the firearm 140 with both the target marker 107 and the orientation marker 109, the firearm 140 is also lined up with the target.

For accuracy, it is preferable that the target marker projector 106 and the orientation marker projector 108 are aligned along a same vertical plane (e.g., through a longitudinal axial plane of the target display device 100) as the camera 102, and projects the target marker 107 and the orientation marker 109 substantially along the same plane.

In an alternative arrangement, the projectors 106, 108, main body 110 casing and control panel 112 can be provided as a module for retro-fitting to an existing camera module, such as an under door camera. In such an arrangement, the projectors are coupled to a camera, such as by means of a bracket which may be secured to the camera module by friction and/or one or more fasteners. Such fasteners may include, for example, screws, threaded bolts, clamps, and the like. The retro-fitting module can be sized and shaped so that, upon retro-fitting, the centreline of the camera view, and the projectors 106, 108 are aligned. Alternatively or additionally, the projectors 106, 108 can be attached to the bracket with adjustable joining means so the angles of projection can be adjusted after fitting the module onto a camera module.

Features in the accompanying drawings that have the same reference numerals are to be considered to have the same function(s) or operation(s), unless the contrary intention is expressed or implied.

The arrangements described are applicable to the defense and firearms industries.

According to an embodiment described above, a target display device can be used in an operation to increase the accuracy for shooting at a target positioned beyond an opaque medium, that is, an object that prevents the shooter from having a direct visual of the target, but which can be shot through. The target display device can be a mobile, cordless device for easy transport and placement by a system operator. As the target display device can be aligned with the target by the system operator who can adjust the orientation of the device by looking at the image captured by the camera mounted on the device, the device does not need a mechanism for controlling or fine-tuning the alignment, or sophisticated image processing capabilities. Further, no modification to the firearm is required to employ the target display device in an operation.

The foregoing describes only some embodiments of the present invention, and modifications and/or changes can be made thereto without departing from the scope and spirit of the invention, the embodiments being illustrative and not restrictive.

In the context of this specification, the word "comprising" and its associated grammatical constructions mean "including principally but not necessarily solely" or "having" or "including", and not "consisting only of". Variations of the word "comprising", such as "comprise" and "comprises" have correspondingly varied meanings.

Although the invention has been described with reference to specific examples, it will be appreciated by those skilled in the art that the invention may be embodied in many other forms.

The invention claimed is:

1. A target display device for assisting to aim at a target beyond a vision obstructing object, the device comprising:
   a forward-facing camera;
   a target marker projector; and
   an orientation marker projector,
wherein:
   the forward-facing camera is adapted to capture an image beyond the vision obstructing object;
   the target marker projector is adapted to project a target marker;
   the orientation marker projector is adapted to project an orientation marker; and
   the forward-facing camera is adapted to capture an image in alignment with the target marker and the orientation marker along a longitudinal axial plane through the target display device.

2. The target display device according to claim 1, wherein, in use:
   the forward-facing camera is adapted to be placed to have the target in line of sight;
   the target marker projector is adapted to project the target marker on the vision obstructing object, the target marker location being indicative of a location of the target; and the orientation marker projector is adapted to project the orientation marker in alignment with the forward-facing camera and the target marker.

3. The target display device according to claim 2, wherein the target marker indicates one or both of: a height for aiming at and a height range for aiming at.

4. The target display device according to claim 2, wherein the target marker is a reticle pattern.

5. The target display device according to claim 4, wherein the reticle pattern comprises one or more of: a line, a dot, a circle, intersecting lines and a rectangle.

6. The target display device according to claim 1, the target marker projector and/or the orientation marker projector projects the target marker and/or the orientation marker in laser in a visible spectrum or an infrared laser.

7. The target display device according to claim 1, wherein the target display device has a longitudinal axial plane extending in a forward-rearward direction of the target display device, the forward-facing camera, the target marker projector and the orientation marker projector are substantially aligned along the longitudinal axial plane, the target marker projector is adapted to project the target marker upward and forward onto the object where the longitudinal axial plane intersects the object, and the orientation marker projector is adapted to project the orientation marker rearward and downward onto a surface on which the display device is placed where the longitudinal axial plane intersects the surface.

8. The target display device according to claim 1, further comprising a communication unit adapted to transmit the image captured by the camera.

9. A target display system comprising the target display device according to claim 8 and a display device communicably coupled to the communication unit of the target display device, the display device adapted to display the image captured by the camera together with a reference marker indicating a centre of the image.

10. The target display system according to claim 9, wherein the display device is a wearable device adapted to be worn on a body of a system operator positioning the target display device.

11. The target display system according to claim 10, wherein the display device is a wearable device adapted to be worn on the arm of the system operator.

12. The target display system according to claim 10, wherein the display device is a head-mounted device.

13. A target display module to be fitted onto a camera module having a forward-facing camera adapted to capture an image beyond a vision obstructing object, the module comprising:
 a target marker projector; and
 an orientation marker projector,
wherein:
 the target marker projector is adapted to project a target marker and the orientation marker projector is adapted to project an orientation marker such that, when the target displaying module is fitted onto a camera module, the target marker and the orientation marker are projected in alignment with the field of the forward-facing camera.

* * * * *